（12）United States Patent
Mallick et al.

(10) Patent No.: US 11,366,590 B2
(45) Date of Patent: Jun. 21, 2022

(54) HOST DEVICE WITH MULTI-PATH LAYER PROVIDING DYNAMIC CONTROL OF ONE OR MORE PATH SELECTION ALGORITHMS

(71) Applicant: EMC IP Holding Company LLC, Hopkinton, MA (US)

(72) Inventors: Sanjib Mallick, Bangalore (IN); Vinay G. Rao, Bangalore (IN); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 48 days.

(21) Appl. No.: 16/599,235

(22) Filed: Oct. 11, 2019

(65) Prior Publication Data
US 2021/0109658 A1   Apr. 15, 2021

(51) Int. Cl.
*G06F 3/06* (2006.01)
*G06F 9/50* (2006.01)
*G06F 9/48* (2006.01)

(52) U.S. Cl.
CPC ............ *G06F 3/0613* (2013.01); *G06F 3/067* (2013.01); *G06F 3/0611* (2013.01); *G06F 3/0635* (2013.01); *G06F 3/0659* (2013.01); *G06F 3/0665* (2013.01); *G06F 9/4881* (2013.01); *G06F 9/505* (2013.01)

(58) Field of Classification Search
USPC ............. 710/36–45, 74, 118, 125, 316, 317; 718/105; 709/238–244; 711/118–146
See application file for complete search history.

(56) References Cited

U.S. PATENT DOCUMENTS

| 6,567,397 | B1 | 5/2003 | Campana et al. |
| 6,687,746 | B1 | 2/2004 | Shuster et al. |
| 6,697,875 | B1 | 2/2004 | Wilson |
| 7,454,437 | B1 | 11/2008 | Lavallee et al. |

(Continued)

OTHER PUBLICATIONS

Kris Piepho, "Dell EMC SC Series Storage: Microsoft Multipath I/O," Dell EMC Best Practices, Jan. 2017, 57 pages.

(Continued)

*Primary Examiner* — Ilwoo Park
(74) *Attorney, Agent, or Firm* — Ryan, Mason & Lewis, LLP

(57) ABSTRACT

A host device is configured to communicate over a network with a storage system comprising a plurality of storage devices. The host device comprises a multi-path input-output (MPIO) driver configured to control delivery of input-output (IO) operations from the host device to the storage system over selected ones of a plurality of paths through the network. The MPIO driver is further configured to determine IO processing performance for each of at least a subset of the paths, and to dynamically adjust a path selection algorithm utilized in selecting particular ones of the paths for delivery of the IO operations from the host device to the storage system based at least in part on the determined performance. For example, dynamically adjusting a path selection algorithm illustratively comprises activating a particular one of a plurality of distinct path selection algorithms available to the MPIO driver and/or adjusting one or more parameters of a given path selection algorithm.

20 Claims, 4 Drawing Sheets

(56) References Cited

U.S. PATENT DOCUMENTS

| | | | |
|---|---|---|---|
| 7,770,053 | B1 | 8/2010 | Bappe et al. |
| 7,809,912 | B1 | 10/2010 | Raizen et al. |
| 7,818,428 | B1 | 10/2010 | Lavallee et al. |
| 7,904,681 | B1 | 3/2011 | Bappe et al. |
| 7,925,872 | B2 | 4/2011 | Lai et al. |
| 8,825,919 | B1 | 9/2014 | Lim et al. |
| 8,874,746 | B1 | 10/2014 | Gonzalez |
| 9,026,694 | B1 | 5/2015 | Davidson et al. |
| 9,400,611 | B1 | 7/2016 | Raizen |
| 9,594,780 | B1 | 3/2017 | Esposito et al. |
| 9,778,852 | B1 | 10/2017 | Marshak et al. |
| 10,353,714 | B1 | 7/2019 | Gokam et al. |
| 10,439,878 | B1 | 10/2019 | Tah et al. |
| 2002/0166005 | A1* | 11/2002 | Errico .................. G06F 9/505 710/38 |
| 2003/0115430 | A1* | 6/2003 | Stone .................. G06F 12/0842 711/158 |
| 2004/0010563 | A1 | 1/2004 | Forte et al. |
| 2006/0277383 | A1 | 12/2006 | Hayden et al. |
| 2008/0043973 | A1 | 2/2008 | Lai et al. |
| 2010/0115154 | A1* | 5/2010 | Tomonaga .......... G06F 13/4022 710/38 |
| 2011/0197027 | A1 | 8/2011 | Balasubramanian et al. |
| 2011/0296230 | A1 | 12/2011 | Chen et al. |
| 2015/0222705 | A1 | 8/2015 | Stephens |
| 2015/0249596 | A1* | 9/2015 | Ogihara ................ H04L 45/123 370/228 |
| 2016/0092136 | A1 | 3/2016 | Balakrishnan et al. |
| 2016/0117113 | A1 | 4/2016 | Li et al. |
| 2016/0335003 | A1 | 11/2016 | Ahmed et al. |
| 2018/0189635 | A1 | 7/2018 | Olarig et al. |
| 2019/0095299 | A1 | 3/2019 | Liu et al. |
| 2019/0108888 | A1 | 4/2019 | Sarkar et al. |
| 2019/0327542 | A1* | 10/2019 | Rivaud .................. H04L 49/15 |
| 2020/0274823 | A1* | 8/2020 | Yang .................. H04L 43/0852 |
| 2021/0089314 | A1* | 3/2021 | Liu .......................... G06F 9/321 |

OTHER PUBLICATIONS

NVM Express, "NVM Express, Revision 1.3," NVM Express, May 1, 2017, 282 pages.

VMware, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

U.S. Appl. No. 15/849,828 filed in the name of Sanjib Mallick et al. filed Dec. 21, 2017 and entitled "Storage System with Input-Output Performance Control Utilizing Application Process Detection."

U.S. Appl. No. 15/795,653 filed in the name of Maneesh Pusalkar et al. filed Oct. 27, 2017 and entitled "Storage System with Network-Wide Configurable Device Names."

U.S. Appl. No. 16/142,274 filed in the name of Sanjib Mallick et al. filed Sep. 26, 2018 and entitled "Host Device with Multi-Path Layer Implementing Automatic Standby Setting for Active-Active Configuration."

\* cited by examiner

HOST DEVICE WITH MULTI-PATH LAYER PROVIDING DYNAMIC CONTROL OF ONE OR MORE PATH SELECTION ALGORITHMS

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (IO) operations for delivery to storage ports of the storage system. The storage ports are typically limited in number and each has limited resources for handling IO operations received from the host devices. Different ones of the host devices can run different applications with widely varying workloads and associated IO patterns. Such host devices also generate additional IO operations in performing various data services such as replication and migration so as to meet business continuity requirements. As a result, it is not uncommon for certain storage ports to periodically experience unexpected and potentially extreme spikes in received IO operations, also referred to herein as IO bursts.

Conventional host device multi-pathing arrangements are in some situations unable to deal adequately with these and other variabilities in IO processing behavior. For example, some existing multi-path layers implement a static path selection approach that does not produce optimal results in all situations.

In addition, conventional approaches of this type can require excessive amounts of CPU processing overhead that are becoming increasingly apparent and problematic, particularly as storage devices evolve towards non-volatile memories, such as storage class memory (SCM) and other types of persistent memory that are accessed with relatively low response times using advanced storage protocols such as NVMe.

SUMMARY

Illustrative embodiments configure a multi-path layer of one or more host devices to include functionality for dynamic control of one or more path selection algorithms in conjunction with communication with a storage array or other type of storage system via a storage area network (SAN) or other type of network. The multi-path layer illustratively comprises at least one multi-path input-output (MPIO) driver configured to process IO operations of at least one host device. The dynamic control in some embodiments includes, for example, activating a particular one of a plurality of distinct path selection algorithms available for activation by the MPIO driver, and/or adjusting one or more parameters of a given path selection algorithm currently activated by the MPIO driver. Such arrangements can dynamically adapt the path selection operations of the multi-path layer to detected IO processing performance of the various paths, thereby leading to reduced CPU processing overhead and enhanced overall system performance.

In one embodiment, an apparatus comprises a host device configured to communicate over a network with a storage system comprising a plurality of storage devices. The host device comprises an MPIO driver configured to control delivery of IO operations from the host device to the storage system over selected ones of a plurality of paths through the network. The MPIO driver is further configured to determine IO processing performance for each of at least a subset of the paths, and to dynamically adjust a path selection algorithm utilized in selecting particular ones of the paths for delivery of the IO operations from the host device to the storage system based at least in part on the determined performance.

Determining IO processing performance for each of at least a subset of the paths illustratively comprises measuring latencies of respective ones of the paths, and detecting a latency imbalance across the paths based at least in part on the measured latencies. Measuring latencies of respective ones of the paths may comprise, for example, sending particular ones of the IO operations over respective ones of the paths and measuring response times of the storage system to the respective IO operations, and/or sending commands other than those of the IO operations from the host device over respective ones of the paths and measuring response times of the storage system to the respective commands. It is to be appreciated that a wide variety of other techniques may be used to measure latencies or to otherwise determine IO processing performance for respective paths in other embodiments.

Dynamically adjusting a path selection algorithm utilized in selecting particular ones of the paths for delivery of the IO operations from the host device to the storage system based at least in part on the determined performance illustratively comprises at least one of activating a particular one of a plurality of distinct path selection algorithms available for activation by the MPIO driver, and adjusting one or more parameters of a given path selection algorithm currently activated by the MPIO driver. Again, other techniques for dynamic adjustment of one or more path selection algorithms can be used.

In some embodiments, activating a particular one of a plurality of distinct path selection algorithms available for activation by the MPIO driver comprises activating a path selection algorithm of a first type responsive to detection of a latency imbalance across the paths, and activating a path selection algorithm of a second type different than the first type responsive to an absence of a latency imbalance across the paths. For example, the path selection algorithm of the first type may comprise an adaptive path selection algorithm, and the path selection algorithm of the second type may comprise a non-adaptive path selection algorithm, such as a round robin path selection algorithm.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
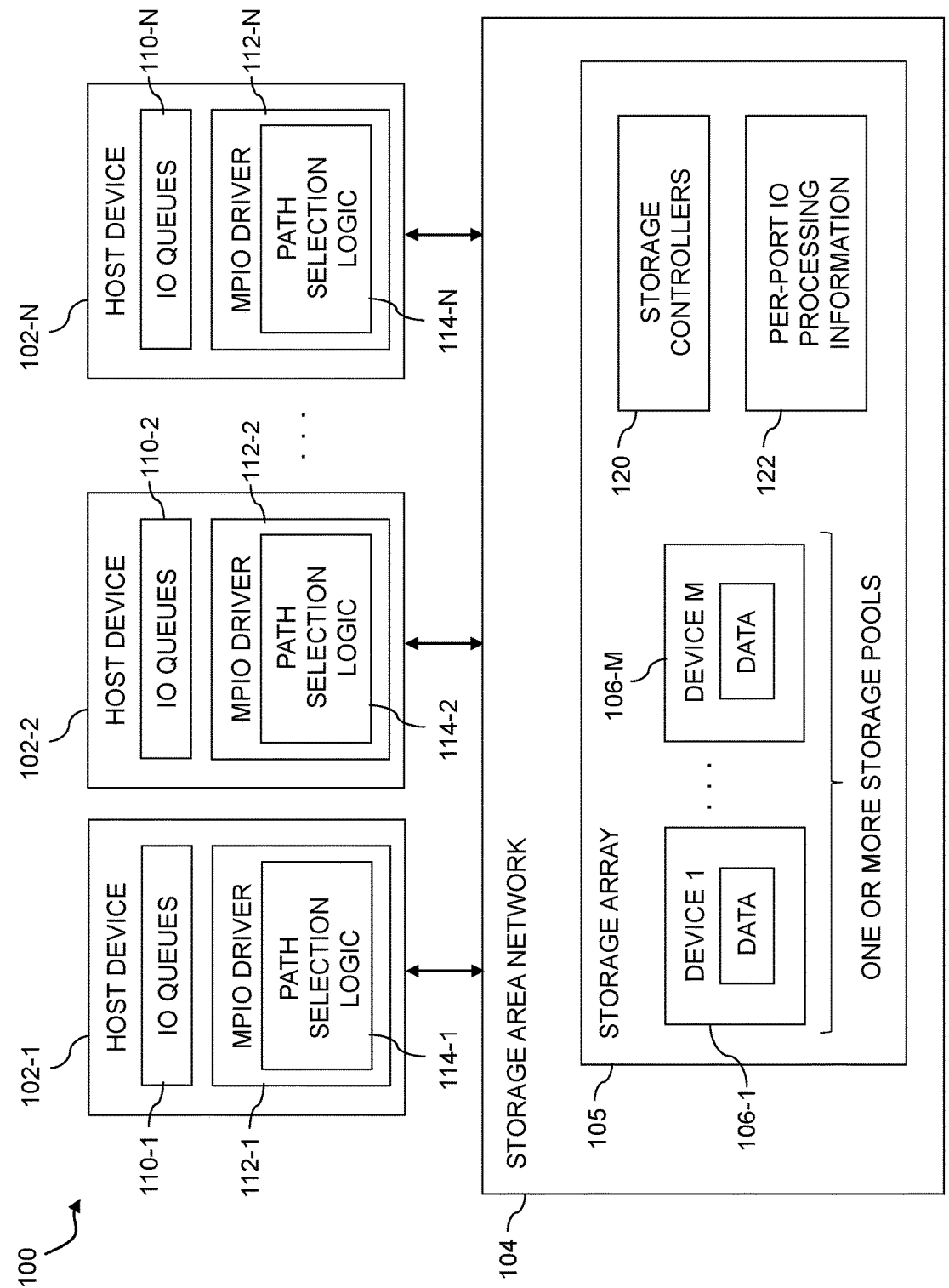
FIG. 1 is a block diagram of an information processing system configured with functionality for dynamic control of one or more path selection algorithms in a multi-path layer of a host device in an illustrative embodiment.

FIG. 1 shows an information processing system 100 configured in accordance with an illustrative embodiment. The information processing system 100 comprises a plurality of host devices 102-1, 102-2, ... 102-N. The host devices 102 communicate over a storage area network (SAN) 104 with at least one storage array 105. The storage array 105 comprises a plurality of storage devices 106-1, ... 106-M each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102, and is therefore also referred to herein as a "shared storage system." Other embodiments can include only a single host device, possibly configured to have exclusive use of the storage system.

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniB and, Gigabit Ethernet or Fibre Channel. Numerous alternative networking arrangements are possible in a given embodiment, as will be appreciated by those skilled in the art.

The host devices 102 comprise respective sets of IO queues 110-1, 110-2, . . . 110-N and respective MPIO drivers 112-1, 112-2, . . . 112-N. The MPIO drivers 112 collectively comprise a multi-path layer of the host devices 102. The multi-path layer provides functionality for dynamic control of one or more path selection algorithms. Such functionality is provided at least in part using respective instances of path selection logic 114-1, 114-2, . . . 114-N implemented within the MPIO drivers 112.

The MPIO drivers 112 may comprise, for example, otherwise conventional MPIO drivers, such as PowerPath® drivers from Dell EMC, suitably modified in the manner disclosed herein to provide functionality for dynamic control of one or more path selection algorithms. Other types of MPIO drivers from other driver vendors may be suitably modified to incorporate functionality for dynamic control of one or more path selection algorithms as disclosed herein.

The term "MPIO driver" as used herein is intended to be broadly construed, and such a component is illustratively implemented at least in part as a combination of software and hardware. For example, MPIO driver 112-1 can comprise one or more software programs running on a hardware processor of host device 102-1.

The MPIO driver 112-1 is configured to deliver IO operations selected from its corresponding set of IO queues 110-1 to the storage array 105 via selected ones of multiple paths over the SAN 104. The sources of the IO operations stored in the set of IO queues 110-1 illustratively include respective processes of one or more applications executing on the host device 102-1. For example, IO operations can be generated by each of multiple processes of a database application running on the host device 102-1. Such processes issue IO operations for delivery to the storage array 105 over the SAN 104. Other types of sources of IO operations may be present in a given implementation of system 100.

The paths from the host device 102-1 to the storage array 105 illustratively comprise paths associated with respective initiator-target pairs, with each initiator comprising a host bus adaptor (HBA) or other initiating entity of the host device 102-1 and each target comprising a port or other targeted entity corresponding to one or more of the storage devices 106 of the storage array 105. As noted above, the storage devices 106 illustratively comprise LUNs or other types of logical storage devices.

In some embodiments, the paths are associated with respective communication links between the host device 102-1 and the storage array 105 with each such communication link having a negotiated link speed. For example, in conjunction with registration of a given HBA to a switch of the SAN 104, the HBA and the switch may negotiate a link speed. The actual link speed that can be achieved in practice in some cases is less than the negotiated link speed, which is a theoretical maximum value.

Various scheduling algorithms, load balancing algorithms and/or other types of algorithms can be utilized by the MPIO driver 112-1 in delivering IO operations from the IO queues 110-1 to the storage array 105 over particular paths via the SAN 104. These and other algorithms are assumed to be encompassed by the term "path selection algorithm" as that term is broadly used herein.

Each IO operation is assumed to comprise one or more commands for instructing the storage array 105 to perform particular types of storage-related functions such as reading data from or writing data to particular logical volumes of the storage array 105. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage array 105. Examples of such HBAs and storage array ports are illustrated in conjunction with the embodiment of FIG. 3.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of the storage array 105. The corresponding logical device illustratively comprises a LUN or other logical storage volume to which the particular IO operation is directed.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user. Some embodiments are configured to send a predetermined command from the host device 102-1 to the storage array 105, illustratively utilizing the MPIO driver 112-1, to determine if zoning and masking information has been changed. The predetermined command can comprise, for example, a log sense command, a mode sense command, a "vendor unique command" or VU command, or combinations of multiple instances of these or other commands, in an otherwise standardized command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path.

The MPIO driver 112-1 is further configured to determine IO processing performance for each of at least a subset of the paths, and to dynamically adjust a path selection algorithm, utilized by the path selection logic 114-1 in selecting particular ones of the paths for delivery of the IO operations from the host device 102-1 to the storage array 105, based at least in part on the determined performance.

In determining IO processing performance of respective paths, the MPIO driver 112-1 obtains information such as, for example, response times or other latency measures of the respective paths. This information is illustratively referred to in the context of some embodiments herein as "path condition information," although other types of information can be used in other embodiments. Dynamic control of one or more path selection algorithms is therefore performed in some embodiments using latency measures.

The above-noted process of determining IO processing performance for each of at least a subset of the paths and dynamically adjusting a path selection algorithm utilized in selecting particular ones of the paths for delivery of the IO operations from the host device to the storage array 105 based at least in part on the determined performance are illustratively repeated in each of a plurality of intervals. The particular duration of such time periods can be a user-configurable parameter, or set by default, and can vary depending upon factors such as the desired resolution of the IO processing performance information and the amount of overhead required to determine that information.

Additional examples of dynamic control of one or more path selection algorithms are described below in conjunction with the embodiments of FIGS. 2 through 4.

In the FIG. 1 embodiment, the storage array 105 comprises a plurality of storage controllers 120 and one or more instances of per-port IO processing information 122. Such per-port IO processing information is illustratively collected by the storage array 105, and in some embodiments may be provided to one or more of the host devices 102 for use in conjunction with path selection.

Additional components not explicitly shown in the figure, such as one or more storage caches, may also be provided in the storage array 105 for use in processing JO operations. For example, in some embodiments, each of the storage controllers 120 has a different local cache or a different allocated portion of a global cache associated therewith, although numerous alternative arrangements are possible. The storage controllers 120 can be implemented as respective storage processors, directors or other storage system components configured to control storage system operations relating to processing of JO operations.

The above-noted path condition information is illustratively determined by the MPIO driver 112-1 and stored in one or more data structures of a kernel-space portion of the MPIO driver 112-1. The kernel-space portion of the MPIO driver 112-1 is illustratively part of an operating system of the host device 102-1. Alternatively, other components of the host device 102-1 can be involved in storage of the path condition information for the storage array 105, possibly using other types of data structures or storage arrangements.

Other types of information utilized in dynamic control of one or more path selection algorithms can be obtained by the host device 102-1 from the storage array 105 utilizing an in-band communication mechanism in which one or more predetermined commands in a designated storage protocol are sent from the host device 102-1 to the storage array 105. Such predetermined commands can comprise, for example, a log sense command, a mode sense command, a "vendor unique command" or VU command, or combinations of multiple instances of these or other commands, in an otherwise standardized command format, such as a SCSI format or other type of format. For example, one or more predetermined commands of the type described above can be used by the host device 102-1 to read at least a portion of the per-port IO processing information 122 from the storage array 105.

Additionally or alternatively, such information can be obtained by the host device 102-1 from the storage array 105 utilizing an out-of-band communication mechanism. For example, an out-of-band communication mechanism of this type can involve host management software of the host device 102-1 communicating with storage array management software of the storage array 105 over an IP network connection or other type of network connection. The host device 102-1 can utilize such information obtained from the storage array 105 in determining IO processing performance of one or more paths.

In some embodiments, determining IO processing performance for each of at least a subset of the paths comprises measuring latencies of respective ones of the paths, and detecting a latency imbalance across the paths based at least in part on the measured latencies. For example, measuring latencies of respective ones of the paths illustratively comprises sending particular ones of the IO operations from the host device 102-1 over respective ones of the paths and measuring response times of the storage array 105 to the respective IO operations. Additionally or alternatively, measuring latencies of respective ones of the paths can comprise sending commands other than those of the IO operations from the host device 102-1 over respective ones of the paths and measuring response times of the storage array 105 to the respective commands. Accordingly, the latencies can be measured using the normal IO operations and/or additional commands that are not part of the normal IO operations. The commands can comprise predetermined commands of the type mentioned above, or other types of commands suitable for use in monitoring response times of paths to the storage array 105.

A variety of different techniques can be used to dynamically adjust one or more path selection algorithms based at least in part on the determined IO processing performance of the respective paths. For example, dynamically adjusting a path selection algorithm utilized in selecting particular ones of the paths for delivery of the IO operations from the host device 102-1 to the storage array 105 based at least in part on the determined performance can comprise activating a particular one of a plurality of distinct path selection algorithms available for activation by the MPIO driver 112-1. Additionally or alternatively, such dynamic control can comprise adjusting one or more parameters of a given path selection algorithm currently activated by the MPIO driver 112-1. Accordingly, a given embodiment can dynamically adjust a path selection algorithm by activating a particular one of a plurality of available path selection algorithms and/or by adjusting one or more parameters of an activated path selection algorithm. Terms such as "dynamic control" and "dynamically adjusting" as used herein in the context of one or more path selection algorithms are intended to be broadly construed.

As a more particular illustration of an arrangement involving activation a particular one of a plurality of distinct path selection algorithms available for activation by the MPIO driver 112-1, such activation comprises activating a path selection algorithm of a first type responsive to detection of a latency imbalance across the paths, and activating a path selection algorithm of a second type different than the first type responsive to an absence of a latency imbalance across the paths.

The path selection algorithm of the first type illustratively comprises an adaptive path selection algorithm, and the path selection algorithm of the second type illustratively comprises a non-adaptive path selection algorithm, such as a round robin path selection algorithm. Other algorithms of different types can be used in other embodiments.

In an example adaptive path selection algorithm, the MPIO driver 112-1 of host device 102-1 computes IO load on each of the paths before selecting a path over which to send the next IO operation from the IO queues 110-1. Although an adaptive path selection algorithm of this type can avoid selection of heavily loaded paths, it requires substantial additional CPU processing overhead. Such additional CPU processing overhead is advantageously reduced in illustrative embodiments by dynamically activating the adaptive path selection algorithm only when IO processing performance of one or more paths indicate that the adaptive algorithm is actually needed, as in the case of a detected latency imbalance between two or more paths. Under other conditions, such as a substantially balanced latency condition among all paths, a non-adaptive algorithm requiring much less CPU processing overhead is activated. As a result of these dynamic activations of different path selection algorithms of different types responsive to changing IO processing performance, CPU processing overhead can be significantly reduced and overall IO throughput increased.

In some embodiments, the MPIO driver 112-1 is configured to throttle application IOs when permissible limits on all available paths reach a designated threshold, thereby avoiding IO bursts that might otherwise occur in that situation.

Additionally or alternatively, the frequency at which path condition information or other similar types of information is measured or otherwise determined by one or more of the host devices 102 through interaction with the storage array 105 can be adjusted as necessary to ensure that the path condition information accurately reflects current IO processing conditions associated with the paths.

A wide variety of other dynamic adjustment arrangements can be implemented using the obtained information. More particular examples of the above dynamic adjustment arrangements will be described elsewhere herein. Other types of dynamic adjustment arrangements can be used in other embodiments.

These and other functions related to dynamic control of one or more path selection algorithms that are referred to herein as being performed by or under the control of the MPIO driver 112-1 can in some embodiments be performed at least in part outside of the MPIO driver 112-1, such as in the host device 102-1 generally.

References herein to an MPIO driver such as MPIO driver 112-1 being configured to obtain, store and utilize measured latencies or other IO processing performance information for dynamic control of one or more path selection algorithms are intended to be broadly construed, and should not be viewed as being limited to any particular storage arrangement, such as storage in a particular host device component or using a particular format. Accordingly, such storage can be in a memory or other storage device that is outside of the MPIO driver.

It is also to be appreciated that the term "IO processing performance" as used herein is intended to be broadly construed, as so to encompass a wide variety of different types of performance measures, including but not limited to response times or other types of measured latencies.

As indicated previously, absent use of the techniques for dynamic control of one or more path selection algorithms in a multi-path layer as disclosed herein, performance of the storage system in processing IO requests received from a host device can be adversely impacted by unexpected and potentially extreme spikes in received IO operations, also referred to herein as IO bursts, at one or more ports. Such IO bursts generated by one or more host devices sharing a storage system can not only cause significant performance degradations in the storage system, but can also adversely impact important functions of the host devices such as load balancing and failover policy execution.

Conventional host device multi-pathing arrangements that implement a static path selection approach are often unable to deal adequately with these and other variabilities in IO processing behavior. Additionally or alternatively, these conventional approaches can require excessive amounts of CPU processing overhead, which is increasingly problematic when using advanced storage protocols such as NVMe.

Such drawbacks are advantageously overcome in illustrative embodiments herein by utilization of a multi-path layer comprising one or more of the MPIO drivers 112 to provide dynamic control of one or more path selection algorithms as described above. These embodiments therefore provide a significant advance over conventional techniques that do not take IO processing performance of respective paths into account in activating or otherwise configuring a particular path selection algorithm. For example, illustrative embodiments dynamically adapt the path selection algorithm to measured latencies of respective paths, leading to reduced CPU processing overhead and enhanced overall performance.

The above-described functions associated with dynamic control of one or more path selection algorithms in the MPIO driver 112-1 are carried out at least in part under the control of its path selection logic 114-1. For example, the path selection logic 114-1 is illustratively configured to control performance of an algorithm comprising the steps of the flow diagram to be described below in conjunction with FIG. 2. In other embodiments, one or more such steps can be more generally performed by the host device 102-1.

It is assumed that each of the other MPIO drivers 112 is configured in a manner similar to that described above and elsewhere herein for the first MPIO driver 112-1. The other host devices 102 of the system 100 are therefore also configured to communicate over the SAN 104 with the storage array 105. The MPIO drivers 112 of such other host devices are each similarly configured to deliver IO operations from its corresponding one of the sets of IO queues 110 to the storage array 105 over selected paths through the SAN 104, and to perform the disclosed functionality for dynamic control of one or more path selection algorithms.

Accordingly, functionality described above in the context of the first MPIO driver 112-1 and the first host device 102-1 is assumed to be similarly performed by each of the other MPIO drivers 112-2 through 112-N and/or more generally by their respective host devices 102-2 through 102-N.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support dynamic control of one or more path selection algorithms.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays, or may be implemented in whole or in part using other types of non-volatile memory.

The storage array 105 in the present embodiment may comprise additional components not explicitly shown in the figure, such as a response time control module and IO operation priority queues, illustratively configured to make use of the above-described persistent memory. For example, the response time control module may be used to implement storage array based adjustments in response time for particular IO operations based at least in part on service level objective (SLO) information stored by the storage array 105 in its persistent memory. The response time control module is assumed to operate in conjunction with the above-noted IO operation priority queues.

The storage array 105 illustratively utilizes its IO operation priority queues to provide different levels of performance for IO operations. For example, the IO operation priority queues may have respective different priority levels. The storage array 105 may be configured to provide different priority levels for different ones of the IO operations by assigning different ones of the IO operations to different ones of the IO operation priority queues. The IO operation priority queues are illustratively associated with respective SLOs for processing of IO operations in the storage array 105. Process tags may be used in assigning different ones of the IO operations to different ones of the IO operation priority queues, as disclosed in U.S. patent application Ser. No. 15/849,828 know U.S. Pat. No. 10,474,367), filed Dec. 21, 2017 and entitled "Storage System with Input-Output Performance Control Utilizing Application Process Detection," which is incorporated by reference herein.

As mentioned above, communications between the host devices 102 and the storage array 105 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage devices 106 of the storage arrays 105 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage array 105 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as one or more VNX®, VMAX®, Unity™ or PowerMax™ storage arrays, commercially available from Dell EMC.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, MPIO drivers 112 and instances of path selection logic 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 208, and is suitable for use in the system 100 but is more generally applicable to other types of systems comprising at least one host device and a storage system. The storage system in this embodiment is assumed to comprise at least one storage array having a plurality of storage devices. The storage devices can include logical storage devices such as LUNs or other logical storage volumes.

Figure 2:
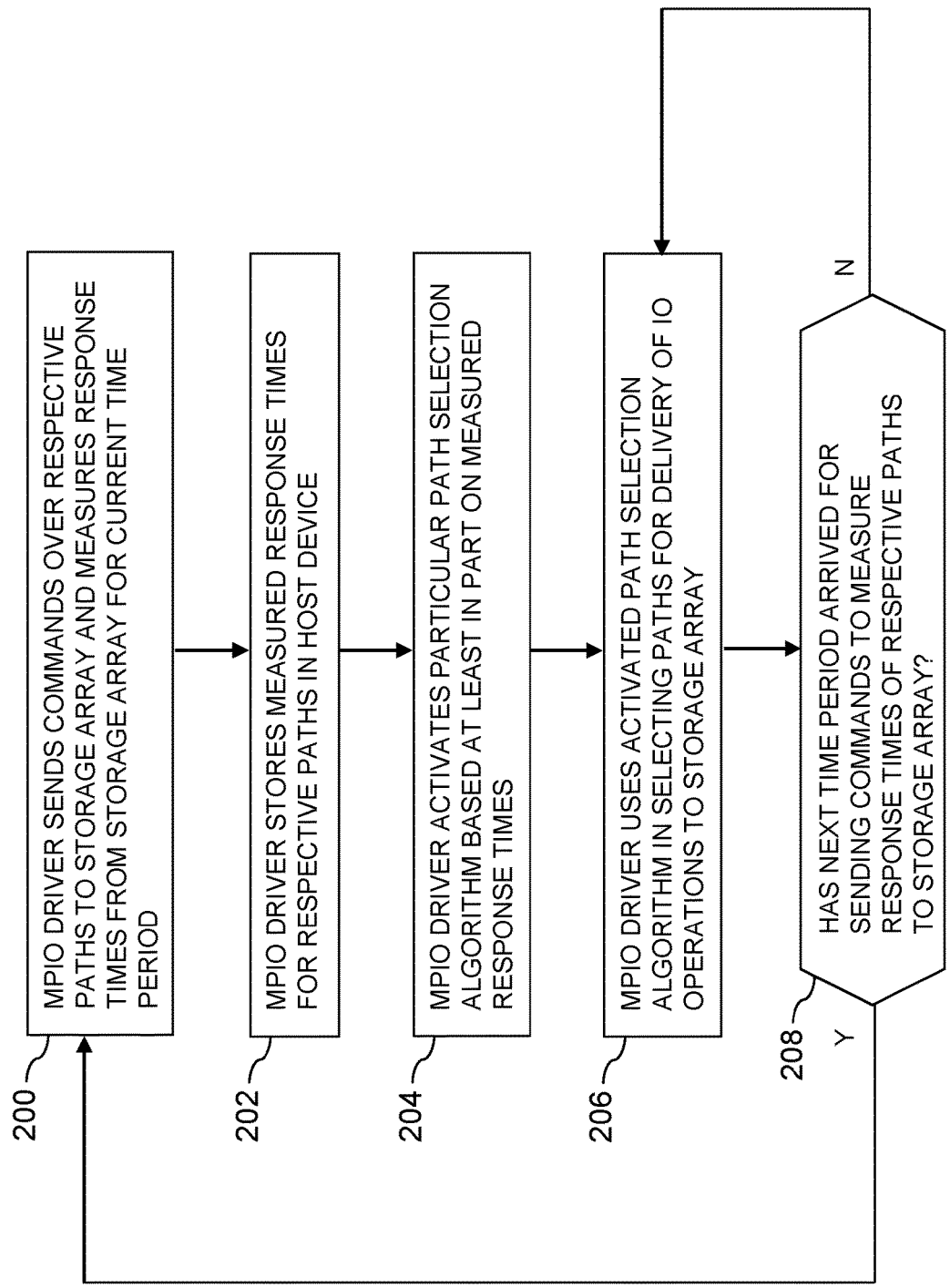
FIG. 2 is a flow diagram of a process for dynamic control of one or more path selection algorithms in a multi-path layer of a host device in an illustrative embodiment.

The steps of the FIG. 2 process are illustratively performed at least in part by or under the control of an MPIO driver of a given host device. For example, portions of the process may be carried out under the control of software, firmware and/or hardware of an instance of path selection logic deployed within the MPIO driver. Accordingly, the FIG. 2 process may be viewed as an example of an algorithm performed by the path selection logic 114-1 of the MPIO driver 112-1 of host device 102-1. Other arrangements of host device components and/or other system components can be configured to perform at least portions of one or more of the steps in other embodiments.

In step 200, the MPIO driver sends commands over respective paths to a storage array and measures response times from the storage array for a current time period. Such response times are examples of what are more generally referred to herein as "latency measures" of the respective paths. As indicated above, such commands can be part of one or more IO operations that would normally be transmitted by the host device to the storage array, and/or can include other commands that are not part of the normal IO operations. Accordingly, sending commands in step 200 can involve sending particular IO operations and/or sending additional or alternative commands that are not part of any particular IO operation.

In step 202, the MPIO driver stores the measured response times for the respective paths in the host device, possibly using one or more kernel-space data structures of the type described elsewhere herein.

In step 204, the MPIO driver activates a particular path selection algorithm based at least in part on the measured response times. For example, the MPIO driver illustratively supports multiple distinct path selection algorithms, such as at least one adaptive algorithm and at least one non-adaptive algorithm, and dynamically activates different ones of those algorithms at different times in accordance with variations in measured response times.

In step 206, the MPIO driver uses the activated path selection algorithm in selecting paths for delivery of IO operations to the storage array. A given such IO operation is illustratively generated by a process of an application running on the host device, and is queued in a given one of the IO queues of the host device with other operations generated by other processes of that application, and possibly other processes of other applications, for delivery to the storage array over a path selected by a dynamically controlled path selection algorithm of an MPIO driver as disclosed herein.

In step 208, a determination is made as to whether or not the next time period has arrived for sending commands to measure response times of respective paths to the storage array. If the next time period for sending the commands has arrived, the process returns to step 200 as indicated in order to send the commands to the storage array. Otherwise, the process returns to step 206 to continue to process IO operations for delivery to the storage array, using the particular activated path selection algorithm in selecting paths for delivery of the IO operations, in the manner previously described. As noted above, the commands sent in step 200 can be part of one or more IO operations, or separate from such IO operations.

Multiple additional instances of the FIG. 2 process may be performed in respective additional host devices that share the storage array. Other embodiments can include multiple storage arrays, with the disclosed functionality for dynamic control of one or more path selection algorithms being implemented for each of those storage arrays.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and functionality for dynamic control of one or more path selection algorithms. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of dynamic control arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
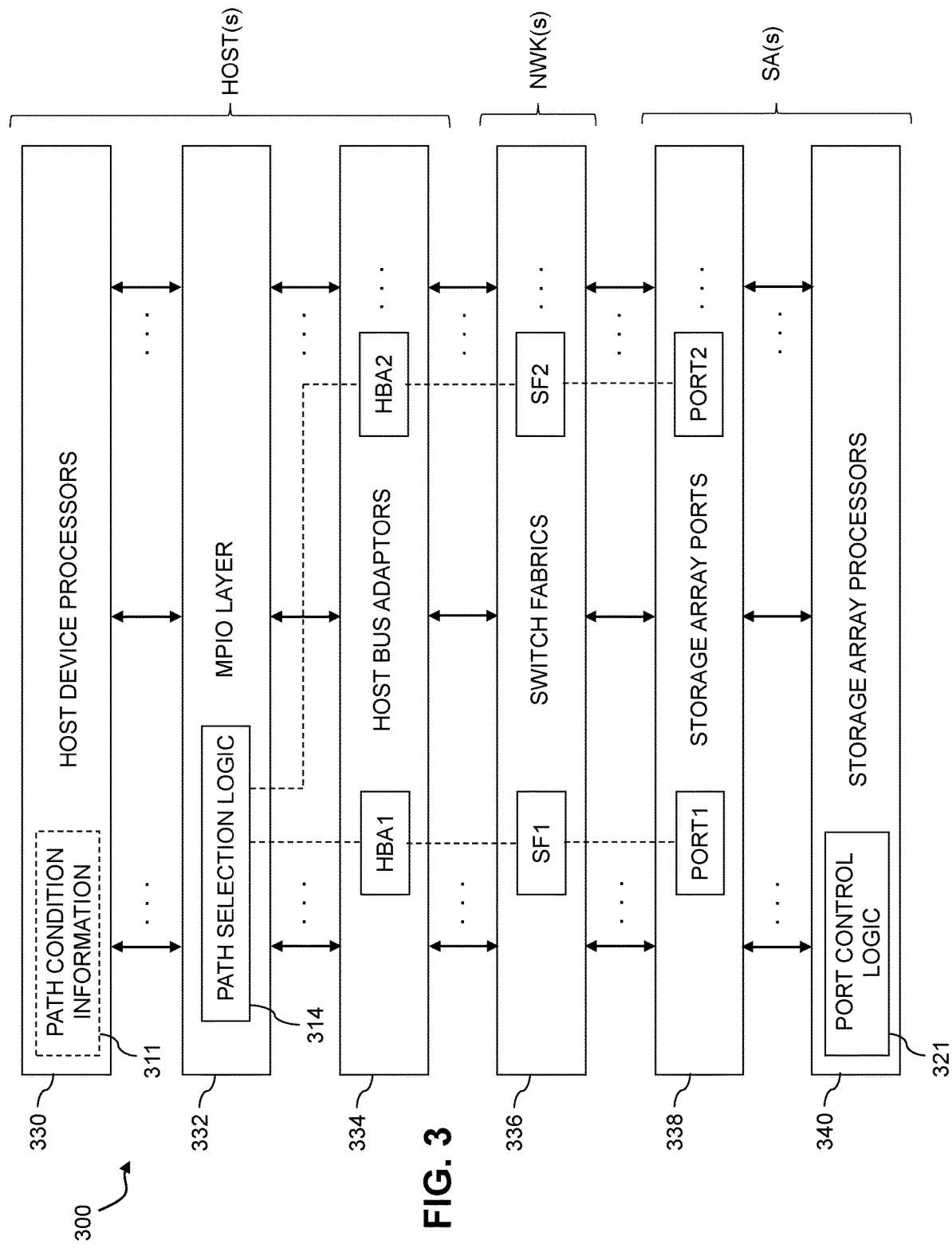
FIG. 3 is a block diagram showing multiple layers of a layered system architecture that includes a multi-path layer with functionality for dynamic control of one or more path selection algorithms in an illustrative embodiment.

Referring now to FIG. 3, another illustrative embodiment is shown. In this embodiment, an information processing system 300 comprises one or more instances of path condition information 311, path selection logic 314 and port control logic 321. The system 300 is configured in accordance with a layered system architecture that illustratively includes a host device processor layer 330, an MPIO layer 332, an HBA layer 334, a switch fabric layer 336, a storage array port layer 338 and a storage array processor layer 340. The host device processor layer 330, the MPIO layer 332 and the HBA layer 334 are associated with one or more host devices, the switch fabric layer 336 is associated with one or more SANs or other types of networks, and the storage array port layer 338 and storage array processor layer 340 are associated with one or more storage arrays ("SAs").

The system 300 in this embodiment implements dynamic control of one or more path selection algorithms as characterized by stored path condition information 311. The path condition information 311 is illustratively shown as part of one or more host device processors of the host device processor layer 330. Again, other path condition information storage arrangements are possible, and the path condition information 311 is therefore shown in dashed outline in the figure. For example, the path condition information 311 in other embodiments is illustratively stored entirely in the MPIO layer 332. It is therefore possible in some embodiments that the path condition information 311 can be stored utilizing a component of the MPIO layer 332, such as within a data structure of the path selection logic 314. The path condition information 311 illustratively comprises IO processing performance measures made by or under the control of the MPIO layer 332 in the manner disclosed herein. For example, the path condition information 311 illustratively comprises average response times or other latency measures, and/or other types of information obtained by a host device.

The MPIO layer 332 is an example of what is also referred to herein as a multi-path layer, and comprises one or more MPIO drivers implemented in respective host devices. Each such MPIO driver illustratively comprises an instance of path selection logic 314 configured to implement functionality for dynamic control of one or more path selection algorithms substantially as previously described. Additional or alternative layers and path selection logic arrangements can be used in other embodiments.

The port control logic 321 implemented in the storage array processor layer 340 controls the configuration and operation of ports of one or more storage arrays. For example, the port control logic 321 can include functionality for allocating available resources among a plurality of ports of a given storage array of the system 300. It is also possible in some embodiments that the port control logic 321 can include multiple distinct port control logic instances for multiple sets of ports of respective ones of a plurality of storage arrays of the system 300. Such port control logic instances can be used, for example, to collect per-port IO processing information within one or more storage arrays and to make such information available to one or more host devices for use in dynamic control of one or more path selection algorithms.

In the system 300, path selection logic 314 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of n paths to a shared storage array, or alternatively different ones of the host devices can have different numbers and types of paths to the storage array.

The path selection logic 314 of the MPIO layer 332 in this embodiment therefore selects paths for delivery of IO operations to the one or more storage arrays having the storage array ports of the storage array port layer 338. In selecting the paths, the path selection logic 314 utilizes a particular path selection algorithm that is dynamically activated based at least in part on IO processing performance of respective paths.

It is assumed in this embodiment that the host devices through their respective MPIO drivers and respective instances of path selection logic 314 provide functionality for dynamic control of one or more path selection algorithms, possibly with involvement of other host device components.

Accordingly, the path selection logic 314 utilizes the path condition information 311 in determining appropriate paths over which to send particular IO operations to ports of one or more storage arrays. As described elsewhere herein, such dynamic control of one or more path selection algorithms can substantially improve system performance.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

Additional illustrative embodiments will now be described. It is assumed in these embodiments that the MPIO driver of a given host device provides the disclosed functionality for dynamic control of one or more path selection algorithms, utilizing a corresponding instance of path selection logic implemented in the MPIO driver, possibly with involvement of one or more other host device components.

Figure 4:
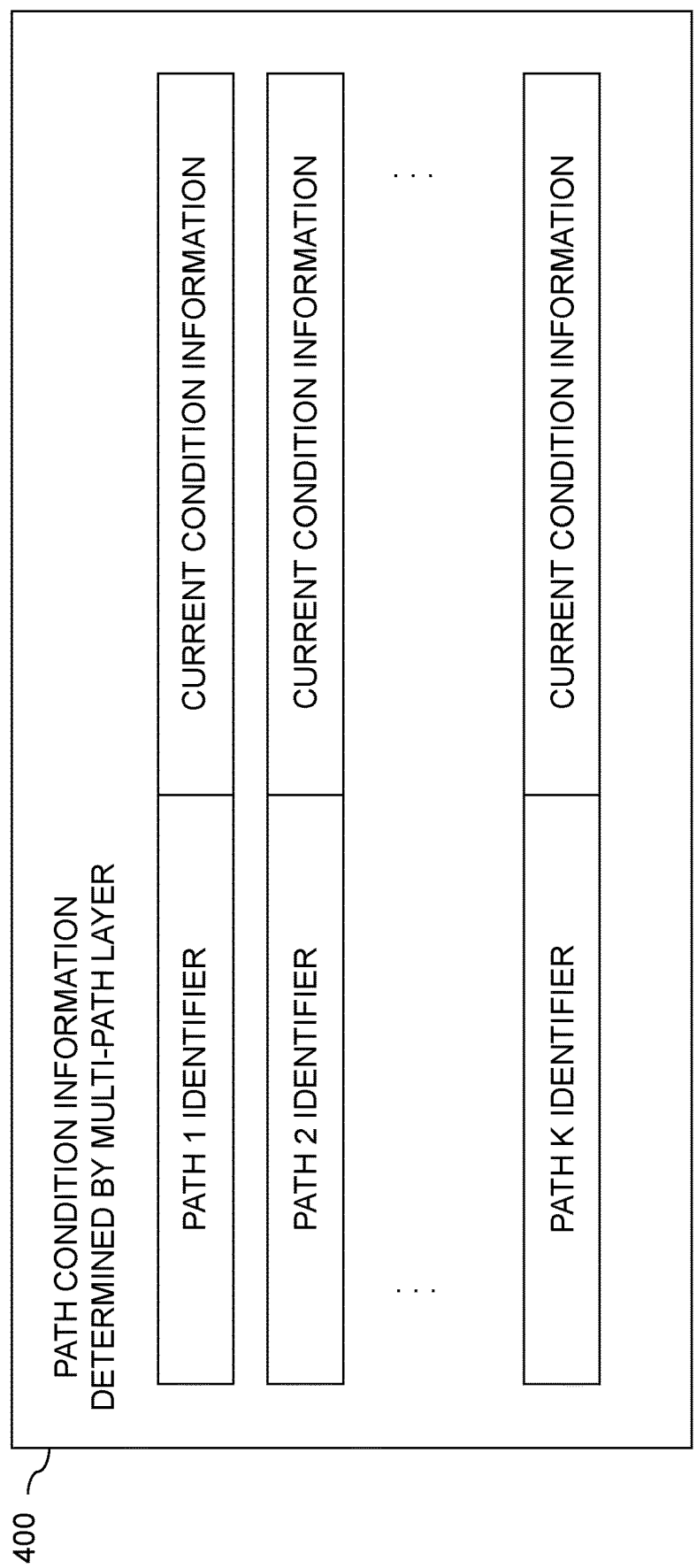
FIG. 4 shows an example of per-path performance information maintained by a host device for use in providing dynamic control of one or more path selection algorithms in an illustrative embodiment.

FIG. 4 shows an example of path condition information 400 determined by a multi-path layer of a host device in an illustrative embodiment. The path condition information 400 in this embodiment is maintained in the form of a table, although other types of data structures can be used in other embodiments. Such information is illustratively determined by the multi-path layer of the host device periodically sending commands over respective paths and measuring the corresponding response times. The commands can be part of one or more IO operations, or separate from the IO operations. The resulting response time measurements are examples of what are also referred to herein as "latency measures" although other types of latency measures can be used. For example, some embodiments compute average response times for each path using multiple commands sent over that path.

In the context of the FIG. 1 embodiment, the path condition information 400 is illustratively obtained by a given one of the MPIO drivers 112 of one of the host devices 102 through interaction with the storage array 105.

The path condition information 400 more particularly comprises a plurality of entries for different ones of the paths to the storage array 105, with each such entry comprising a path identifier and current condition information for that path. The paths are denoted in the figure as Path 1, Path 2, ... Path K, and have their respective identifiers in a first column of the table of FIG. 4. The second column of the table includes the current condition information, which illustratively comprises latency measures of the type described above. Numerous other types and arrangements of entries and fields can be used, and the term "path condition information" as used herein is therefore intended to be broadly construed. Such information can be stored in a data structure of a multi-path layer of the host device and/or in other data structures elsewhere in the host device.

Another additional embodiment implements a process that is illustratively performed by the path selection logic of the MPIO driver, possibly in cooperation with other host device components. Such an embodiment can be configured, for example, to determine latency measures for respective paths, and to activate a particular path selection algorithm, such as an adaptive path selection algorithm or a non-adaptive path selection algorithm, responsive to the determined latency measures.

In this embodiment, the process is configured to dynamically alter the activated path selection algorithm based at least in part on IO processing performance of respective paths, possibly including various load factors as well as fabric states, in an attempt to optimize the path selection algorithm for the current JO processing performance state so as to improve the overall performance of the system.

The MPIO driver of a given host device in this embodiment is configured to determine JO processing performance for each of a plurality of paths by recording JO latency for each path at a desired granularity and monitoring corresponding JO statistics for each path. For example, JO statistics such as average response time can be computed and monitored for each path using multiple instances of measured response times for that path. This illustratively involves collecting response time samples on defined intervals for each path and computing and monitoring the corresponding IO statistics. An example of such an interval, which also defines the time period referred to in the FIG. 2 embodiment, may be on the order of 1 second, although other intervals can be used depending upon the particular needs and other characteristics of a given implementation.

Using the determined IO processing performance as described above, the process in this embodiment identifies a particular one of a plurality of available conditions for the IO processing performance, for example, based at least in part on average response times of respective ones of the paths. In other words, the process classifies the current IO processing performance as being characterized by a particular one of the available conditions. The identified condition resulting from the classification can change over time responsive to changes in the IO processing performance of the respective paths.

The available conditions into which the current IO processing performance can be classified illustratively include the following:

1. A normal condition in which differences between average response times for respective pairs of the paths are all below a first threshold. For example, all of the paths have a similar average response time with relatively low variance for a particular storage device, such as a designated logical volume. This is an example of a condition in which there is no IO performance pressure.

2. An imbalanced condition in which at least two of the paths have a difference between their respective average response times that is at or above the first threshold. This is an example of a condition involving a latency imbalance that may cause IO performance pressure.

3. An urgent condition in which the average response times for one or more of the paths are at or above a second threshold. This is an example of a condition in which there is IO performance pressure. It is also referred to herein as a "crisis" condition.

Additional or alternative conditions of other types can be used to classify the current IO processing performance in other embodiments, possibly based on other types of latency measures or indicators of IO processing performance for respective paths.

Depending on the particular condition into which the current IO processing performance is classified, different types of dynamic adjustment of at least one path selection algorithm are performed by the MPIO driver.

In a first case, responsive to the identified condition being the normal condition, dynamically adjusting a path selection algorithm comprises determining if the IO processing performance indicates primarily sequential IO operations, primarily random IO operations, or periodic switching between primarily sequential IO operations and primarily random IO operations.

If the IO processing performance indicates primarily sequential IO operations, the MPIO driver activates a cache-aligned path selection algorithm that is aligned with a cache configuration of the storage array. As noted above, a given storage array can have a particular cache configuration, and the cache-aligned path selection algorithm illustratively uses information obtained from the storage array regarding its particular cache configuration to perform path selection in a manner that increases the likelihood of cache hits. For example, each of the storage controllers 120 can have a different local cache or a different allocated portion of a global cache associated therewith, and the sizes and configurations of those storage controller caches are taken into account by the cache-aligned path selection algorithm.

As a more particular example, in the case of a PowerMax™ storage array, which includes a cache arrangement in which storage controllers in the form of respective directors are assigned respective local caches, a cache-aligned path selection algorithm can be configured to select paths for IO operations based at least in part on the cache arrangement, as determined through interaction with the storage array or using other techniques. For example, the cache-aligned path selection algorithm can be configured to send designated groups of sequential IO operations of a particular size (e.g., 256K) to the same director in order to maximize usage of its local cache and associated pre-fetch functionality.

In some embodiments, primarily sequential IO operations can be indicated if a corresponding confidence level is at or above a particular threshold confidence level (e.g., 80% confidence).

If the IO processing performance indicates primarily random IO operations, the MPIO driver activates a non-adaptive path selection algorithm, such as a round robin path selection algorithm. Such an algorithm generally requires substantially less CPU processing overhead than an adaptive path selection algorithm, and illustratively spreads the IO operations uniformly across the storage controllers and their associated paths.

If the IO processing performance indicates periodically sequential and periodically random IO operations, the MPIO driver switches between the cache-aligned path selection algorithm and the non-adaptive path selection algorithm. Such switching in some embodiments can involve predicting, based at least in part on the monitored IO processing performance of the respective paths, when sequential IO operations are likely to occur, such that the cache-aligned path selection algorithm or other type of path selection algorithm that is best suited for dealing with sequential IO operations can be activated.

Such predictive arrangements utilize machine learning or other types of artificial intelligence arrangements that are trained using historical IO processing performance statistics so as to be able to determine accurately when sequential IO operations are likely to occur. Predictive arrangements of this type can therefore predict transitions between periods of sequential IO operations and random IO operations.

Periods of sequential and periodically random IO operations can arise, for example, as a result of read or write bursts. An example of an application that generates read bursts is a Virtual Desktop Infrastructure (VDI) application, and an example of an application that generates write bursts is an in-memory database application which generates a write burst upon commit, although numerous other applications can generate read or write bursts. In some embodiments of this type, the MPIO driver attempts to predict the sequential IO time periods and activates the cache-aligned path selection algorithm, or another type of path selection algorithm that can efficiently process sequential IOs, for the predicted time period. The prediction can utilize a simple linear regression model, or more sophisticated machine learning or artificial intelligence techniques.

When the MPIO driver detects that the period of sequential IO is over, it will switch the path selection algorithm back to a non-adaptive path selection algorithm, such as a round robin path selection algorithm, that is better suited to the processing of random IOs.

In a second case, responsive to the identified condition being the imbalanced condition, dynamically adjusting a path selection algorithm comprises activating an adaptive path selection algorithm of the type described elsewhere herein. The imbalanced condition illustratively encompasses situations in which the IO processing performance of the respective paths varies widely between the paths. For example, there may be a wide statistical variance between the latency measures of the respective paths, possibly attributable to differences in connection speeds, storage port loads and other factors. Under such a condition, the MPIO driver activates the adaptive path selection algorithm, in which an optimal path is determined for each IO operation, at the cost of additional CPU processing overhead. The MPIO driver continues to monitor the IO processing performance per path, and when the imbalance is reduced below a corresponding threshold, the MPIO driver will dynamically alter the path selection algorithm in accordance with the new identified condition.

In a third case, responsive to the identified condition being the urgent condition, dynamically adjusting a path selection algorithm comprises activating a path selection algorithm that isolates the one or more paths for which the average response times are at or above the second threshold. For example, a crisis condition of this type may be indicated when measured latencies are high and growing, possibly in combination with increasing IO retry counts. The MPIO driver will therefore activate a path selection algorithm that isolates the high-latency paths. If all of the paths are exhibiting high latency, the MPIO driver can throttle down the delivery of IO operations to the corresponding storage devices until the path latencies are reduced to normal levels. For example, the MPIO driver can leave IO operations in the host queues while waiting for the path latencies to decline. If after a certain waiting time only a few paths are still exhibiting high latencies, the MPIO driver can transition to an adaptive algorithm of the type utilized above in conjunction with detection of an imbalanced condition, such that IOs are diverted to the lower latency paths.

The particular features and functionality of the illustrative embodiments described above can be varied in other embodiments. For example, the particular conditions and path selection algorithm types mentioned above can be altered to accommodate the particular needs of a given implementation. In addition, various parameters of a given path selection algorithm, such as its particular thresholds, distribution mechanisms, timing arrangements and other parameters, can be dynamically adjusted based on measured latencies or other IO processing performance information determined as disclosed herein.

Also, as mentioned previously, different instances of the above-described processes and other techniques for dynamic control of one or more path selection algorithms can be performed by different MPIO drivers in different host devices.

The particular dynamic control arrangements described above are therefore presented by way of illustrative example only. Numerous alternative arrangements of these and other features can be used in implementing dynamic control of one or more path selection algorithms in other illustrative embodiments.

The illustrative embodiments disclosed herein can provide a number of significant advantages relative to conventional arrangements.

For example, some embodiments configure a multi-path layer of one or more host devices to include functionality for dynamic control of one or more path selection algorithms, which dynamically adapts path selection in a host device to the changing IO processing performance of respective paths.

As a result, these and other embodiments exhibit reduced CPU processing overhead and enhanced overall performance.

In addition, illustrative embodiments are better able to deal with IO bursts and other variabilities in IO processing behavior. For example, some embodiments implement a multi-path layer configured with dynamic control of path selection that can advantageously avoid or otherwise alleviate IO bursts, leading to improved performance.

Accordingly, some embodiments leverage a multi-path layer of one or more host devices to provide enhanced performance in processing of IO operations directed to one or more storage arrays or other types of storage systems.

These and other arrangements are advantageously configured to provide efficient dynamic control of one or more path selection algorithms even in the presence of substantial path changes such as those that may result when paths are added or deleted as a result of zoning and masking changes or other types of storage system reconfigurations performed by a storage administrator or other user.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the instances of path selection logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic and additional or alternative components. Also, the particular configurations of system and device elements and associated processing operations illustratively shown in the drawings can be varied in other embodiments. For example, a wide variety of different MPIO driver configurations and associated arrangements for dynamic control of one or more path selection algorithms can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
a host device configured to communicate over a network with a storage system comprising a plurality of storage devices;
the host device comprising:
a multi-path input-output driver configured to control delivery of input-output operations from the host device to the storage system over selected ones of a plurality of paths through the network;
wherein the multi-path input-output driver is further configured:
to determine input-output processing performance for each of at least a subset of the paths; and
to dynamically adjust a path selection algorithm utilized in selecting particular ones of the paths for delivery of the input-output operations from the host device to the storage system based at least in part on the determined performance;
wherein determining input-output processing performance for each of at least a subset of the paths comprises:
measuring latencies of respective ones of the paths; and
detecting a latency imbalance across the paths based at least in part on the measured latencies, wherein detecting the latency imbalance comprises:

determining respective first and second response time measures of at least a first path and a second path of the respective ones of the paths;

identifying a difference between the respective first and second response time measures of at least the first path and the second path; and determining whether the difference between the respective first and second response time measures of at least the first path and the second path is at or above a threshold;

wherein dynamically adjusting a path selection algorithm utilized in selecting particular ones of the paths for delivery of the input-output operations comprises:

activating a path selection algorithm of a first type available for activation by the multi-path input-output driver responsive to determining that the difference between the respective first and second response time measures of at least the first path and the second path is at or above the threshold; and activating a path selection algorithm of a second type different than the first type and available for activation by the multi-path input-output driver responsive to determining that the difference between the respective first and second response time measures of at least the first path and the second path is below the threshold;

wherein determining input-output processing performance for each of at least a subset of the paths further comprises identifying a particular one of a plurality of available conditions for the input-output processing performance based at least in part on response time measures of the respective ones of the paths;

wherein the available conditions comprise at least a normal condition in which differences between response time measures for respective pairs of the paths are all below a first threshold; and wherein responsive to the identified condition being the normal condition, dynamically adjusting a path selection algorithm utilized in selecting particular ones of the paths for delivery of the input-output operations further comprises, if the input-output processing performance indicates primarily sequential input-output operations, activating a cache-aligned path selection algorithm that is aligned with a cache configuration of the storage system and that uses data from the storage system regarding the cache configuration to perform path selection in a manner that increases a likelihood of cache hits.

2. The apparatus of claim 1 further comprising one or more additional host devices each configured to communicate over the network with the storage system and wherein each additional host device comprises a multi-path input-output driver configured to control delivery of input-output operations from that host device to the storage system over selected ones of a plurality of paths through the network.

3. The apparatus of claim 1 wherein the storage devices comprise respective logical storage volumes of the storage system.

4. The apparatus of claim 1 wherein the paths are associated with respective initiator-target pairs and wherein each of a plurality of initiators of the initiator-target pairs comprises a corresponding host bus adaptor of the host device and each of a plurality of targets of the initiator-target pairs comprises a corresponding port of the storage system.

5. The apparatus of claim 1 wherein determining respective first and second response time measures of at least a first path and a second path of the respective ones of the paths comprises at least one of:

(i) sending particular ones of the input-output operations over the respective ones of the paths and measuring response times of the storage system to the respective particular ones of the input-output operations; and (ii) sending commands other than those of the input-output operations from the host device over the respective ones of the paths and measuring response times of the storage system to the respective commands.

6. The apparatus of claim 1 wherein dynamically adjusting a path selection algorithm utilized in selecting particular ones of the paths for delivery of the input-output operations further comprises:

adjusting one or more parameters of a given path selection algorithm currently activated by the multi-path input-output driver.

7. The apparatus of claim 1 wherein the path selection algorithm of the first type comprises an adaptive path selection algorithm.

8. The apparatus of claim 1 wherein the path selection algorithm of the second type comprises a non-adaptive path selection algorithm.

9. The apparatus of claim 8 wherein the non-adaptive path selection algorithm comprises a round robin path selection algorithm.

10. The apparatus of claim 1 wherein determining input-output processing performance for each of at least a subset of the paths and dynamically adjusting a path selection algorithm utilized in selecting particular ones of the paths for delivery of the input-output operations are repeated in each of a plurality of intervals.

11. The apparatus of claim 1
wherein the available conditions further comprise at least one of:
an imbalanced condition in which two or more of the paths have a difference between their respective response time measures that is at or above the first threshold; and
an urgent condition in which the response time measures for one or more of the paths are at or above a second threshold.

12. The apparatus of claim 11 wherein:
responsive to the identified condition being the normal condition, dynamically adjusting a path selection algorithm further comprises:
if the input-output processing performance indicates primarily random input-output operations, activating a non-adaptive path selection algorithm; and
if the input-output processing performance indicates periodically sequential and periodically random input-output operations, switching between the cache-aligned path selection algorithm and the non-adaptive path selection algorithm;
responsive to the identified condition being the imbalanced condition, dynamically adjusting a path selection algorithm comprises activating an adaptive path selection algorithm; and
responsive to the identified condition being the urgent condition, dynamically adjusting a path selection algorithm comprises activating a path selection algorithm that isolates the one or more paths for which the response time measures are at or above the second threshold.

13. A method comprising:
configuring a multi-path input-output driver of a host device to control delivery of input-output operations from the host device to a storage system over selected ones of a plurality of paths through a network;

the multi-path input-output driver:
determining input-output processing performance for each of at least a subset of the paths; and
dynamically adjusting a path selection algorithm utilized in selecting particular ones of the paths for delivery of the input-output operations from the host device to the storage system based at least in part on the determined performance;
wherein determining input-output processing performance for each of at least a subset of the paths comprises:
measuring latencies of respective ones of the paths; and
detecting a latency imbalance across the paths based at least in part on the measured latencies, wherein detecting the latency imbalance comprises:
determining respective first and second response time measures of at least a first path and a second path of the respective ones of the paths;
identifying a difference between the respective first and second response time measures of at least the first path and the second path; and
determining whether the difference between the respective first and second response time measures of at least the first path and the second path is at or above a threshold;
wherein dynamically adjusting a path selection algorithm utilized in selecting particular ones of the paths for delivery of the input-output operations comprises:
activating a path selection algorithm of a first type available for activation by the multi-path input-output driver responsive to determining that the difference between the respective first and second response time measures of at least the first path and the second path is at or above the threshold; and
activating a path selection algorithm of a second type different than the first type and available for activation by the multi-path input-output driver responsive to determining that the difference between the respective first and second response time measures of at least the first path and the second path is below the threshold;
wherein determining input-output processing performance for each of at least a subset of the paths further comprises identifying a particular one of a plurality of available conditions for the input-output processing performance based at least in part on response time measures of the respective ones of the paths;
wherein the available conditions comprise at least a normal condition in which differences between response time measures for respective pairs of the paths are all below a first threshold; and
wherein responsive to the identified condition being the normal condition, dynamically adjusting a path selection algorithm utilized in selecting particular ones of the paths for delivery of the input-output operations further comprises, if the input-output processing performance indicates primarily sequential input-output operations, activating a cache-aligned path selection algorithm that is aligned with a cache configuration of the storage system and that uses data from the storage system regarding the cache configuration to perform path selection in a manner that increases a likelihood of cache hits.

14. The method of claim 13 wherein dynamically adjusting a path selection algorithm utilized in selecting particular ones of the paths for delivery of the input-output operations further comprises:
adjusting one or more parameters of a given path selection algorithm currently activated by the multi-path input-output driver.

15. The method of claim 13 wherein the path selection algorithm of the first type comprises an adaptive path selection algorithm.

16. The method of claim 13 wherein the path selection algorithm of the second type comprises a non-adaptive path selection algorithm.

17. A computer program product comprising a non-transitory processor-readable storage medium having stored therein program code of one or more software programs, wherein the program code, when executed by a host device comprising a multi-path input-output driver, the host device being configured to communicate over a network with a storage system, causes the multi-path input-output driver:
to control delivery of input-output operations from the host device to the storage system over selected ones of a plurality of paths through the network;
to determine input-output processing performance for each of at least a subset of the paths; and
to dynamically adjust a path selection algorithm utilized in selecting particular ones of the paths for delivery of the input-output operations from the host device to the storage system based at least in part on the determined performance;
wherein determining input-output processing performance for each of at least a subset of the paths comprises:
measuring latencies of respective ones of the paths; and
detecting a latency imbalance across the paths based at least in part on the measured latencies, wherein detecting the latency imbalance comprises:
determining respective first and second response time measures of at least a first path and a second path of the respective ones of the paths;
identifying a difference between the respective first and second response time measures of at least the first path and the second path; and
determining whether the difference between the respective first and second response time measures of at least the first path and the second path is at or above a threshold;
wherein dynamically adjusting a path selection algorithm utilized in selecting particular ones of the paths for delivery of the input-output operations comprises:
activating a path selection algorithm of a first type available for activation by the multi-path input-output driver responsive to determining that the difference between the respective first and second response time measures of at least the first path and the second path is at or above the threshold; and
activating a path selection algorithm of a second type different than the first type and available for activation by the multi-path input-output driver responsive to determining that the difference between the respective first and second response time measures of at least the first path and the second path is below the threshold;
wherein determining input-output processing performance for each of at least a subset of the paths further comprises identifying a particular one of a plurality of available conditions for the input-output processing performance based at least in part on response time measures of the respective ones of the paths;
wherein the available conditions comprise at least a normal condition in which differences between response time measures for respective pairs of the paths are all below a first threshold; and wherein responsive to the identified condition being the normal condition, dynamically adjusting a path selection algorithm utilized in selecting particular ones of the paths for delivery of the input-output operations further comprises, if the input-output processing performance indicates primarily sequential input-output operations, activating a cache-aligned path selection algorithm that is aligned with a cache configuration of the storage system and that uses data from the storage system regarding the cache configuration to perform path selection in a manner that increases a likelihood of cache hits.

18. The computer program product of claim 17 wherein dynamically adjusting a path selection algorithm utilized in selecting particular ones of the paths for delivery of the input-output operations further comprises:

adjusting one or more parameters of a given path selection algorithm currently activated by the multi-path input-output driver.

19. The computer program product of claim 17 wherein the path selection algorithm of the first type comprises an adaptive path selection algorithm.

20. The computer program product of claim 17 wherein the path selection algorithm of the second type comprises a non-adaptive path selection algorithm.

* * * * *